US008338802B2

(12) United States Patent
Zhang et al.

(10) Patent No.: US 8,338,802 B2
(45) Date of Patent: Dec. 25, 2012

(54) TERAHERTZ RADIATION ANTI-REFLECTION DEVICES AND METHODS FOR HANDLING TERAHERTZ RADIATION

(75) Inventors: Xi-Cheng Zhang, Melrose, NY (US); Pengyu Han, San Jose, CA (US); Yuting W. Chen, Hyde Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 13/218,993

(22) Filed: Aug. 26, 2011

(65) Prior Publication Data

US 2012/0049090 A1    Mar. 1, 2012

Related U.S. Application Data

(60) Provisional application No. 61/402,351, filed on Aug. 27, 2010.

(51) Int. Cl.
*H01J 19/12* (2006.01)
*G02B 1/00* (2006.01)
*B23P 11/00* (2006.01)
*G02B 5/00* (2006.01)
*G01J 1/00* (2006.01)

(52) U.S. Cl. ............... 250/492.1; 250/503.1; 250/507.1

(58) Field of Classification Search ............... 250/491.1, 250/492.1, 492.2, 492.22, 492.23, 494.1, 250/495.1, 503.1, 505.1, 507.1, 517.1
See application file for complete search history.

(56) References Cited

U.S. PATENT DOCUMENTS

| | | | | |
|---|---|---|---|---|
| 5,714,920 A * | 2/1998 | Ivanov et al. | ............... | 333/219.1 |
| 5,990,767 A * | 11/1999 | Ivanov et al. | ............... | 333/219.1 |
| 7,091,457 B2 * | 8/2006 | Gregoire et al. | ............... | 219/690 |
| 7,208,710 B2 * | 4/2007 | Gregoire et al. | ............... | 219/697 |
| 2006/0102621 A1 * | 5/2006 | Gregoire et al. | ............... | 219/690 |
| 2006/0102622 A1 * | 5/2006 | Gregoire et al. | ............... | 219/695 |
| 2006/0289503 A1 * | 12/2006 | Gregoire et al. | ............... | 219/695 |
| 2007/0121230 A1 * | 5/2007 | Klein | ............... | 359/886 |
| 2011/0247197 A1 * | 10/2011 | Finn | ............... | 29/600 |

OTHER PUBLICATIONS

"Materials with on-demand refractive indices in the terahertz range", Kadlec, et al. Optics Letters, vol. 33, No. 19, Oct. 1, 2008, pp. 2275-2277.
"Coherent millimetre wave to mid-infrared measurements with continuous bandwith reaching 40 THz", Karpowicz, et al., Electronics Letters, vol. 44, No. 8, Apr. 10, 2008, 2 pp.
"Design and performance of reflective terahertz air-biased-coherent-detection for time-domain spectroscopy", Ho et al., Optics Express, vol. 18, No. 3, Feb. 1, 2010, pp. 2872-2883.

* cited by examiner

*Primary Examiner* — Bernard E Souw
(74) *Attorney, Agent, or Firm* — Heslin Rothenberg Farley & Mesiti P.C.

(57) ABSTRACT

A terahertz (THz) anti-reflection device, for example, a broadband tunable THz anti-reflection device, includes a silicon substrate having a plurality of recesses, each of the plurality of recesses having a plurality of cavities of decreasing dimension. The cavities may be nested polygonal cavities, for example, having a square or rectangular cross section. The recesses having the cavities may be positioned at regular periods, for example, periods ranging from 10 μm to 20 μm. The devices may be fabricated by conventional lithographic methods. Also disclosed are methods for modifying terahertz radiation and methods for fabricating anti-reflection devices.

45 Claims, 12 Drawing Sheets

60

| LAYER | AIR | 1 | 2 | 3 | SILICON |
|---|---|---|---|---|---|
| REFRACTIVE INDEX, n | 1 | 1.55 | 2.25 | 2.95 | 3.42 |
| LAYER HEIGHT | | 8.9 μm | 6.3 μm | 4.8 μm | |
| AIR RATIO (%) | 100 | 77.44 | 42.26 | 10.89 | 0 |
| HOLE DIMENSION (Λ=20μm) | | 17.6 μm X 17.6 μm | 13.0 μm X 13.0 μm | 6.6 μm X 6.6 μm | |
| HOLE DIMENSION (Λ=15μm) | | 13.2 μm X 13.2 μm | 9.7 μm X 9.7 μm | 4.9 μm X 4.9 μm | |

*FIG. 9*

TERAHERTZ RADIATION ANTI-REFLECTION DEVICES AND METHODS FOR HANDLING TERAHERTZ RADIATION

CROSS-REFERENCE TO RELATED APPLICATION

This application claims priority from U.S. Provisional Patent Application 61/402,351, filed on Aug. 27, 2010, the disclosure of which is included by reference herein in its entirety.

STATE AND FEDERAL FUNDED RESEARCH

The invention described herein was made with U.S. Government support under Contract Number W911NF-07-1-0278 awarded by the Army Research Office. The U.S. Government has certain rights to this invention.

BACKGROUND OF THE INVENTION

1. Field of the Invention

This invention relates generally to the manipulation and detection of terahertz radiation, and in particular to anti-reflection surfaces suitable for use with terahertz radiation.

2. Description of Related Art

Silicon, especially high resistivity silicon, is widely used in terahertz (THz) components due to its broadband transparent window spanning from microwave to mid-infrared with little absorption of electromagnetic waves. However, because of its inherent high dielectric constant, silicon is usually associated with high Fresnel reflection loss (30% reflectivity in THz power from a single surface) and possibly limiting spectral resolution stemming from the finite time window as a result of secondary reflection from its surfaces. The performance of THz systems can be enhanced by reducing or minimizing the reflection of THz radiation at the air-silicon interface. Reducing reflection can increase dynamic range and improve spectral resolution of THz-based systems.

Anti-reflection (AR) techniques in the visible wavelengths of electromagnetic radiation are well developed. However, in the THz range of the elecrtromangetic spectrum, researchers have yet to identify appropriate materials and material implementation to effectively provide anti-reflection for THz radiation. For example, although high resistivity silicon is a suitable material for a wide range of THz components, such as, windows, filters, and beam splitters, because of silicon's high transparency and low dispersion in the whole THz range, silicon is typically associated with high Fresnel loss due to silicon's high index of refraction. Due to the need to alleviate the high loss and reduce interference, researches have recently attempted to address this need for anti-reflection techniques for THz radiation.

The anti-reflection of electromagnetic radiation waves is typically attempted by single-layer interference designs, absorptive anti-reflection design, inhomogeneous design, and multilayer design. The results of applying these methods and devices have been unsatisfactory. As a result, researches have also attempted to alter the refractive index of materials using a modified structure. For example, silicon "nanotips," thin metal layers, and surface relief structures have been employed as anti-reflection devices for THz radiation. Typically, these investigations utilize a single-layer design, which is associated with either limited anti-reflection bandwidth or significant insertion loss. However, the present art of THz anti-reflection techniques remain unsatisfactory.

Accordingly, a need persists for a THz anti-reflection device, specifically, a tunable broadband anti-reflection device, having improved broadband anti-reflection functions at THz frequencies, which may be manufactured by conventional fabrication methods.

SUMMARY OF ASPECTS OF THE INVENTION

Aspects of the present invention provide the anti-reflection devices and methods that address the recognized need in the art. According to aspects of the present invention, the inventors provide the desired anti-reflection function by selectively etching off part of a substrate, for example, a silicon substrate, to provide specific patterns. The fabricated devices may have a pattern comprising a three-layer structure. The present invention is based upon the concept of "gradient-index" of anti-reflection coating theory. For example, a continuous Gaussian profile may first be calculated with a maximum reflective index (for example, 3.42, for silicon) and a minimum refractive index (for example, 1, for air). A discretization procedure is applied to obtain the refractive indices of multiple laminar layers and their corresponding thickness per unit wavelength (that is, the wavelength of the propagating optical beam). It is found that anti-reflection performance is better with more laminar layers. In one aspect of the present invention, a three-layer design is provided due to fabrication feasibility and to the satisfying anti-reflection effect that such a design exhibits.

One embodiment of the present invention is a terahertz (THz) radiation anti-reflection device comprising or including: a substrate, for example, a silicon substrate, having a plurality of recesses, each of the plurality of recesses comprising a plurality of cavities of decreasing dimension. In one aspect, the plurality of cavities may comprise a plurality of nested polygonal cavities, for example, cavities having a square or a rectangular cross section. In another aspect, the plurality of recesses may comprise a period, for example, a repeating period ranging from 5 micrometers ($\mu m$) to 50 $\mu m$. The substrate may have a thickness ranging from 5 $\mu m$ and 50 $\mu m$. The plurality of recesses may share a common feature, example, a corner location or a wall plane.

Another embodiment of the invention is a method of fabricating a terahertz (THz) radiation anti-reflection device, the method comprising or including: introducing a plurality of recesses to a substrate, each of the plurality of recesses comprising a plurality of cavities of decreasing dimension.

A further embodiment of the invention is a method for handling terahertz radiation comprising or including: directing terahertz radiation on a substrate having a plurality of recesses, each of the plurality of recesses comprising a plurality of cavities of decreasing dimension; and transmitting at least some of the terahertz radiation through the substrate while minimizing reflection of the terahertz radiation from the substrate with the plurality of recesses. In one aspect, the plurality of cavities may comprise a plurality of nested polygonal cavities, for example, cavities having a square or a rectangular cross section. In another aspect, the plurality of recesses may comprise a period, for example, a repeating period ranging from 5 micrometers ($\mu m$) to 50 $\mu m$. The substrate may have a thickness ranging from 5 $\mu m$ and 50 $\mu m$. The plurality of recesses may share a common feature, example, a corner location or a wall plane.

Details of these aspects of the invention, as well as further aspects of the invention, will become more readily apparent upon review of the following drawings and the accompanying claims.

BRIEF DESCRIPTION OF THE FIGURES

The subject matter that is regarded as the invention is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

FIG. 9 is a table of design parameters for a three-layer anti-reflection surface for a device according to an aspect of the invention.

DETAILED DESCRIPTION OF FIGURES

The details and scope of the aspects of the present invention can best be understood upon review of the attached figures and their following descriptions.

Figure 1:
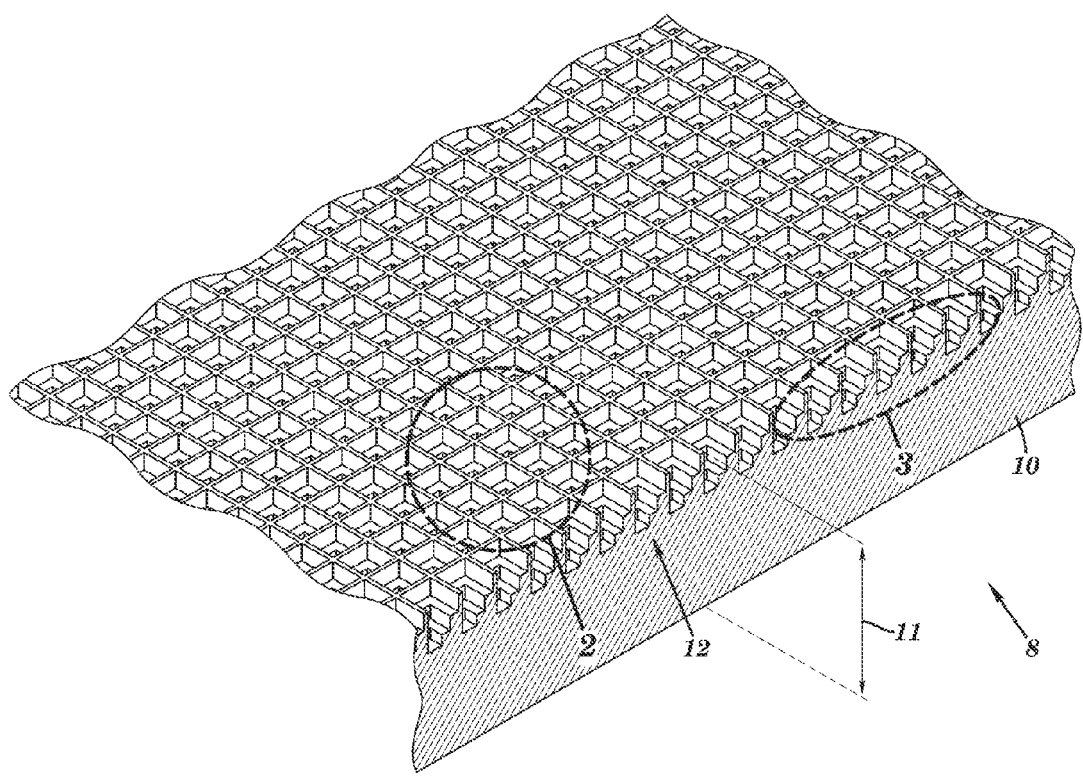
FIG. 1 is a perspective view of a substrate having an anti-reflection surface according to one aspect of the invention.

FIG. 1 is a perspective view of a device 8 comprising a substrate 10 having an anti-reflection surface 12 according to one aspect of the invention. Substrate 10 may comprise any appropriate material, but may typically be a silicon substrate, for example, a silicon substrate having a thickness 11 ranging from about 1 nanometer [nm] to about 500 micrometers [µm]. Substrate 10 may also be made of other materials, for example, semi-conductor materials, such as, germanium (Ge), gallium arsenide (GaAs), indium phosphide (InP), and their equivalents; polymers, such as, photo resists, benzocyclobutene, organosilicon, and their equivalents; insulating materials, such as, silicon dioxide and its equivalents; and metals, such as, copper, gold, or silver, and their equivalents.

Figure 2:
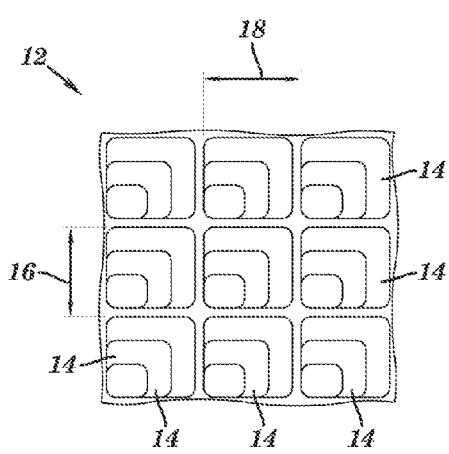
FIG. 2 is a detailed top plan view of the anti-reflection surface shown in FIG. 1 as identified by Detail 2 in FIG. 1.
Figure 3:
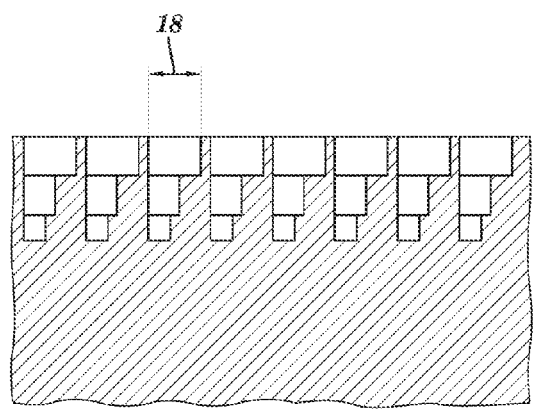
FIG. 3 is a detailed side elevation view of the anti-reflection surface shown in FIG. 1 as identified by Detail 3 in FIG. 1

FIG. 2 is a detailed top plan view of the anti-reflection surface 12 of device 8 shown in FIG. 1 as identified by Detail 2 in FIG. 1. FIG. 3 is a detailed side elevation view of the anti-reflection surface 12 of device 8 shown in FIG. 1 as identified by Detail 3 in FIG. 1.

As shown in FIG. 2, surface 12 may typically comprise a plurality of structures 14, for example, a plurality of substantially identical structures 14, evenly spaced on substrate 10. According to aspects of the invention, structures 14 may typically comprise cavities, recesses, or depressions, for example, nested cavities, recesses, or depressions. In one aspect structures 14 may be evenly spaced, that is, having a "period" or "pitch," in one or two dimensions, for example, in a first dimension having a pitch 16 and a second dimension, for instance, orthogonal to the first dimension, having a pitch 18. The period or pitches 16 and 18 may range from about 5 nm to about 500 mm, for example, between about 10 nm and about 50 nm. In one aspect, the period or pitches 16 and 18 may range from about 15 nm to about 25 nm.

The total thickness 11 of the substrate 10 having an anti-reflection surface 12 may range from about 10 nm to about 1 µm, for example, between about 300 nm to about 500 nm. According to one aspect, the total thickness 11 may be comparable to the unit wavelength. In one aspect, by choosing different structure thicknesses 11, the anti-reflection profile of the invention may be tuned as desired, that is, the devices may be tunable by varying the thickness 11.

Figure 4:
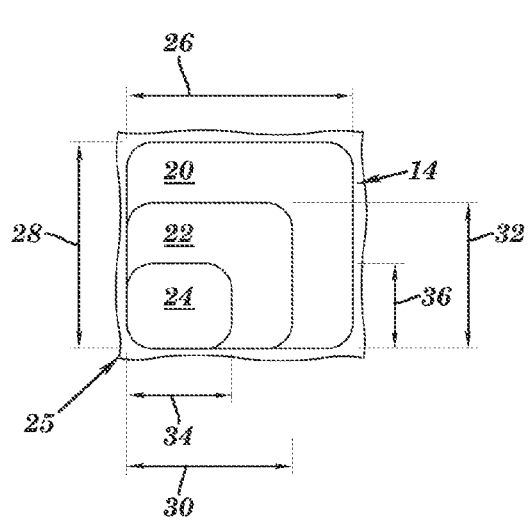
FIG. 4 is an enlarged plan view of a typical cavity shown in FIG. 2.
Figure 5:
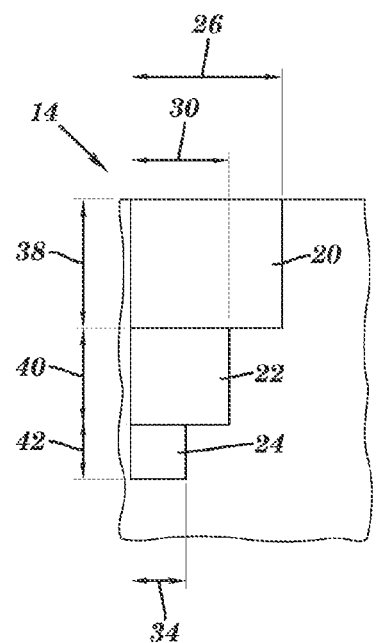
FIG. 5 is an enlarged elevation view of a typical cavity shown in FIG. 3.

FIG. 4 is an enlarged plan view of a typical structure 14 comprising nested cavities shown in FIG. 2, and FIG. 5 is an enlarged elevation view of a typical nested cavity 14 shown in FIG. 3.

As shown in FIGS. 4 and 5, structures 14 may comprise a plurality of cavities 20, 22, and 24, for example, at least two "nested" cavities. According to aspects of the invention "nested cavities" comprise cavities sharing at least one boundary with another adjacent cavity, for example, the bottom surface of cavity 20 defines the top surface of cavity 22. In another aspect, nested cavities comprise cavities defining an opening in an adjacent cavity, for example, the opening of cavity 24 is positioned in the bottom surface of cavity 22.

In the aspects of the invention shown in FIGS. 4 and 5, cavities 20, 22, and 24 are generally rectangular in shape, for example, each cavity 20, 22, and 24 may comprise a hollow parallelepiped. However, it is envisioned that according to aspects of the invention cavities 20, 22, and 24 may be cylindrical in shape, for example, comprising cylinders having an axis and a circular, oval, or polygonal cross section. In one aspect, as shown in FIGS. 4 and 5, cavities 20, 22, and 24 may share a common corner or vertex 25, though any common corner or vertex may be shared. However, it is envisioned that in other aspects of the invention that at least one of the cavities may not share a common corner or vertex, for example, only two cavities may share a common corner. In another aspect, no cavities may share a common corner or vertex.

As also shown in FIGS. 4 and 5, in one aspect, two walls of each of the cavities may share common planes, for example, the side walls of cavities 20, 22, and 24, may share common planes about the common corner 25 of cavities 20, 22, and 24. However, it is also envisioned that walls of at least one of the cavities may not share a common plane with the walls of other cavities. For example, in one aspect, only one wall of each cavity 20, 22, and 24 may share a plane with at least one other wall of another cavity 20, 22, and 24; or no walls of any cavity 20, 22, or 24 may share a plane with a wall of any other cavity 20, 22, and 24.

As shown in FIGS. 4 and 5, the cavities 20, 22, and 24 may comprise cavities of substantially decreasing cross sectional area. For example, as shown in FIG. 4, cavity 20 may have dimensions 26 and 28 defining a first area and cavity 22 may have dimensions 30 and 32 defining a second area less than the first area of cavity 20. However, in one aspect, though the second area of cavity 22 may be less than the first area of cavity 20, dimension 30 or 32 of cavity 22 may be substantially equal to a dimension 26 or 28 of cavity 20. Also, as shown in FIG. 4, cavity 24 may have dimensions 34 and 36 defining a third area, less than the second area of cavity 22; however, in one aspect, though the third area of cavity 24 may be less than the second area of cavity 22, a dimension 34 or 36 of cavity 24 may be substantially equal to a dimension 30 or 32 of cavity 22. As shown in FIG. 5, cavities 20, 22, and 24 may have depths or heights 38, 40, and 42, respectively. According to one aspect of the invention, the dimensions of cavity 24, for example, the area, are smaller than the dimensions of cavity 22, for example, the area; cavity 24 is positioned inside cavity 22; the dimensions of cavity 22, for example, the area, are smaller than the dimensions of cavity 20, for example, the area; and cavity 22 is positioned inside cavity 20.

According to aspects of the invention, the dimensions of cavities 20, 22, and 24, that is, dimensions 26, 28, 30, 32, 34, and 36 shown in FIG. 4 may range from about 5 nm to about 500 millimeters [mm], for example, between about 100 nm and about 100 µm, and typically about 5 µm and about 30 µm. The depths 38, 40, and 42 of cavities 20, 22, and 24, respectively, shown in FIG. 5 may range from about 100 nm to about 500 mm, for example, between about 500 nm and about 500 µm, and typically between about 5 µm and about 30 µm. It is to be understood that aspects of the present invention may have dimensions anywhere beyond or between these representative ranges.

Cavities 20, 22, and 24 of anti-reflective surface 12 may be fabricated by conventional lithographic methods, for example, ultraviolet (UV), deep ultraviolet (DUV), or extreme ultraviolet (EUV) lithographic methods, for example, with the use of appropriately sized photo-resist hard masks. For instance, cavities 20, 22, and 24 may be fabricated by deep reactive ion etching (DRIE). In one aspect, the lithographic etching of structure 14 may begin with the etching of the deepest cavity, for example, cavity 24, and then may be repeated with an appropriate mask for cavity 22 and then cavity 20. As noted above, the cavities may share a common feature, such as, a corner or a wall. In one aspect, cavities 20, 22, and 24 may be aligned by using a marker during the fabrication process, for example, to ensure that cavies 20, 22, and 24 are positioned as desired, for example, to share a common corner. For instance, when fabricated by lithographic methods, markers or indicia, such as, a "+" shape features, may be positioned on a substrate being treated, for example, on opposite sides of the substrate. During lithography process, the two markers on the substrate may be accurately aligned on the photo-mask to insure accurate alignment of, for example, cavities 20, 22, and 24.

Figure 6:
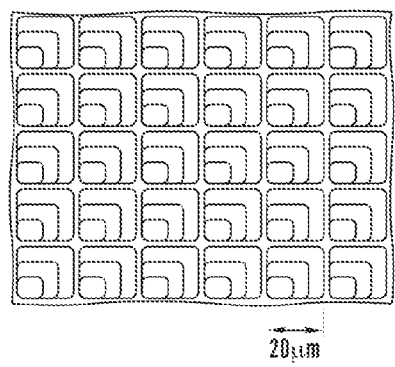
FIG. 6 is a scanning electron microscope (SEM) image of a top plan view of an anti-reflection surface according to an aspect of the present invention.
Figure 7:
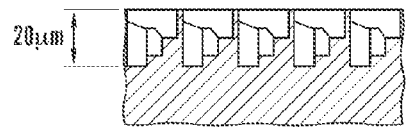
FIG. 7 is a scanning electron microscope (SEM) image of a side elevation view of an anti-reflection surface according to an aspect of the present invention.

FIG. 6 is a scanning electron microscope (SEM) image of a top plan view of the anti-reflection surface of a device fabricated according to an aspect of the present invention. FIG. 7 is a scanning electron microscope (SEM) image of a side elevation view of the anti-reflection surface of a device according to an aspect of the present invention.

According to aspects of the inventing, by using a transfer matrix method, the normal incidence reflectance of aspects of the invention may be theoretically estimated. For example, each layer or cavity of the structure 14 may be represented by a propagation matrix, $P_{(i)}$ and each interface between two adjacent layers may be represented by a transmission matrix, $T_{(i)}$. The overall transmission matrix, M, is the product of these matrices. Reflectance and transmittance is acquired by converting transmission matrix M into scattering matrix S.

Figure 8:
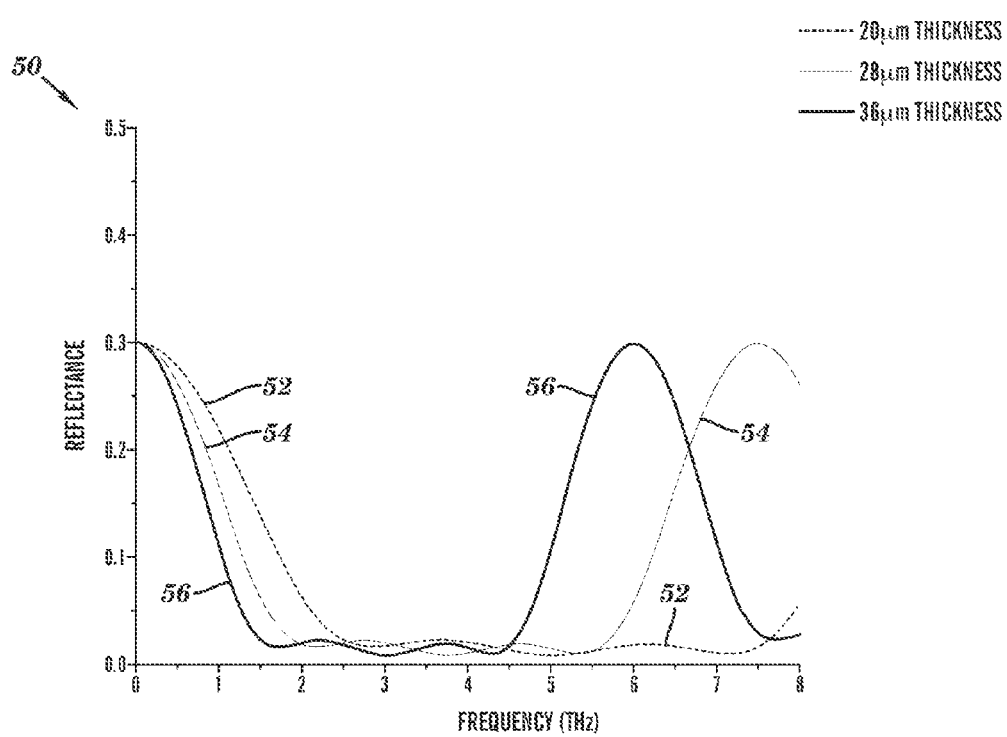
FIG. 8 is a graphical representation of the theoretical reflectance of a three-layer anti-reflective surface according to one aspect of the invention.

FIG. 8 is a graphical representation 50 of the theoretical reflectance of a three-layer anti-reflective surface 12 according to one aspect of the invention. The three curves shown in FIG. 8 correspond to devices having a total thickness 11 (see FIG. 1) of 20 micrometers (µm), curve 52; 28 µm, curve 54; and 36 µm, curve 56. The inventors have found through experimentation that the effective refractive indices of each layer of a three-layer device may be provided by providing "air columns," for example, by etching, of different densities into substrates, for example, silicon substrates, and then tuning the air-to-material ratio to provide a desired anti-reflection. In contrast to anti-reflection gratings of the prior art, where silicon structures typically provide the "periodic elements" of the anti-reflection grating, according to aspects of the present invention, air columns, or cavities in the substrate, provide the periodic elements and the substrate material, for example, silicon, defines the "spacing" between the periodic air column or cavity elements. Accordingly, due to this switching of the role of structures, aspects of the present invention are sometimes referred to as "inverted, photonic gratings."

According to aspects of the invention, by applying a capacitor-like formula to the air column (or cavity) structure, for example, as taught by Kadlec, et al. (2008) (the disclosure of which are included by reference herein), the effective refractive index, n, of each layer of the invention can be derived by Equation (1).

$$n = \sqrt{\frac{n_{silicon}^2 \cdot a}{n_{silicon}^2 \cdot a + 1 - a} + n_{silicon}^2 \cdot (1-a)}, \quad (1)$$

In Equation (1), "a" is the square root of the filling factor of air columns (or cavities) in a specific layer and "$n_{silicon}$" is the refractive index of the substrate, in this case, a silicon substrate with an index $n_{silicon}$ of 3.42.

In the design of aspects of the invention, two parameters are typically important: (1) device thickness, t, (see 11 in FIG. 1) which is related to center anti-reflection frequency; and structure period, p, which is related to diffraction. In one aspect of the invention, the period or pitch between structures 14 may range form about 5 µm to about 50 µm, for example, between about 10 µm and about 30 µm, and is typically between about 15 µm and about 20 µm. In one aspect, this period may roughly correspond to the diffraction limits of 6 THz radiation or 8 THz radiation, respectively. In one aspect, the performance of device 8 may be tunable to the desired characteristics by adjusting or varying the period of the cavities 14. In one aspect, a thickness t of the invention may be chosen such that the achievable reflectance of the device can be below a certain percentage for a given THz range. For example, in one aspect, the thickness t is chosen, or is tunable, so that the achievable reflectance is below about 20% over a THz range. In another aspect, the thickness t is chosen so that the achievable reflectance is below about 5% for a radiation range of from about 2 THz to over 6 THz. In one aspect, a thickness of 20 µm may be used. The design parameters of one three-layer aspect of the invention etched in a silicon substrate are provided in the table 60 shown in FIG. 9 for periods, p, of 15 µm and 20 µm. The refractive indices, n, that appear in Table 60 for each of three layers are computed with Equation (1). The "Air ratio" that appear in Table 60 are computed from the dimension of the air columns (or cavities) shown in Table 60.

Testing and Evaluation

Aspects of the present invention were evaluated with a THz air-biased-coherence-detection system, for example, a system disclosed by Karpowicz, et al. (2008) or Ho, et al. (2010), the disclosures of which are included by reference herein. Specifically, a 20-um-thick anti-reflection device according to aspects of the invention was evaluated. The evaluation system used has a bandwidth of 0.2 THZ to over 10 THz. A planar high resistivity silicon wafer was used as a reference. According to an aspect of the invention, since high resistivity silicon has very little absorption in the THz range, the incident THz wave will be reflected, transmitted, or diffracted at the anti-reflection device interface.

Figure 10:
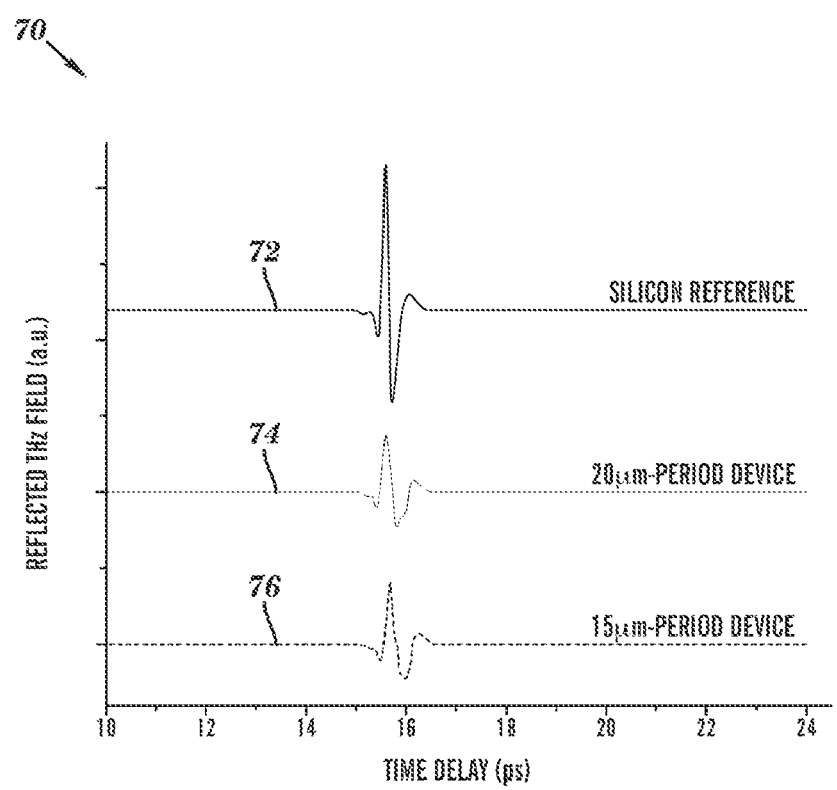
FIG. 10 a graph of reflected THz time-domain waveforms from a silicon reference and two anti-reflection devices according to aspects of the invention.

The reflectance of aspects of the invention are presented in FIG. 10. FIG. 10 is a graph 70 the reflected THz time-domain waveforms from the silicon reference, curve 72; an anti-reflection device having 20-μm-period structures, curve 74; and an anti-reflection device having 15-μm-period structures, curve 76. As shown in FIG. 10, the reflected waveform amplitudes of the anti-reflective devices according to aspects of the invention, that is, curves 74 and 76, are much smaller than the reflected waveform amplitude of the silicon reference, that is, curve 72. As known in the art, these small reflected waveform amplitudes are indicative of the significant anti-reflection effect of aspects of the invention.

Figure 11:
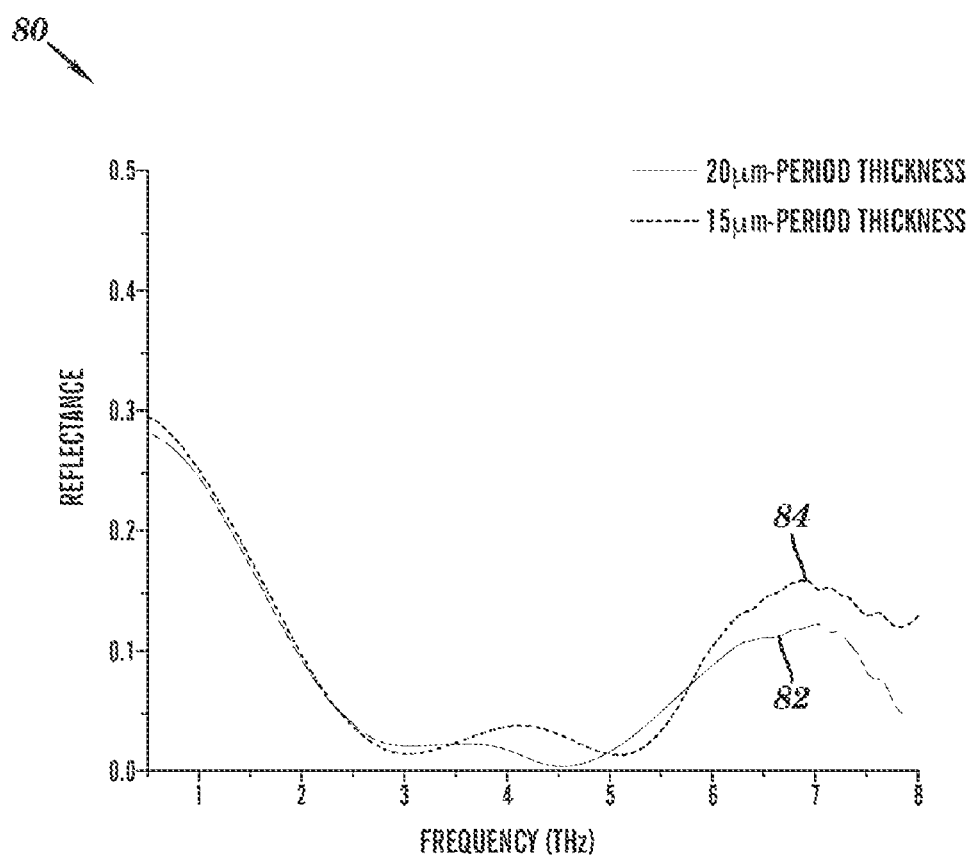
FIG. 11 is a graph of power reflectance of anti-reflecting devices according to aspects of the invention.

The power reflectance of aspects of the invention was also compared with the reference silicon. Power reflectance is calculated from the Fourier-transform spectra and is shown in FIG. 11. FIG. 11 presents a graph 80 of reflectance of the 20-μm-period device, curve 82, and the 15-μm-period device, curve 84. As shown in FIG. 11, reflectance of the devices according to aspects of the invention is reduced to less than 5% (that is, less than 0.05 reflectance on the ordinate of graph 80) between the frequencies of about 2.2 THz to about 5.5 THz.

Figure 12:
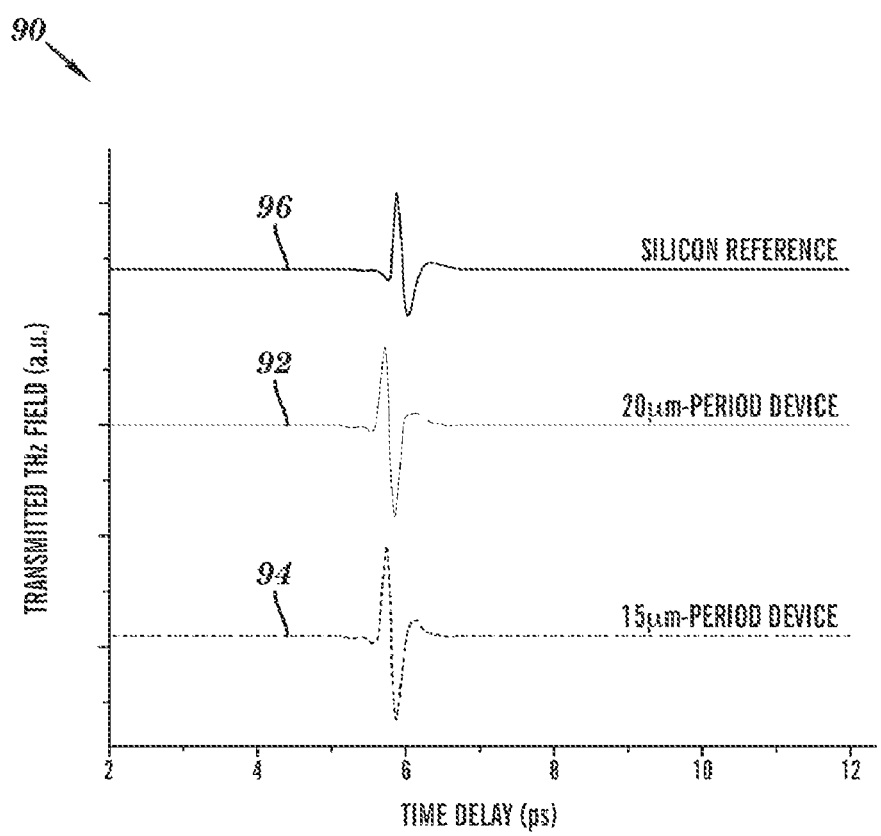
FIG. 12 is a graph of a comparison of THz waveforms in the transmission direction for two aspects of the invention with a silicon reference.

FIG. 12 shows a graph 90 showing a comparison of the THz waveform in the transmission direction (that is, zeroth-order diffraction) for the 20-μm-period device, curve 92, and the 15-μm-period device, curve 94, with the silicon reference, curve 96. As also known in the art, enhanced transmission of aspects of the present invention can be observed from the increased peak-to-peak amplitude of the curves for the two devices, that is, curves 92 and 94, compared to the reference curve 96.

Figure 13:
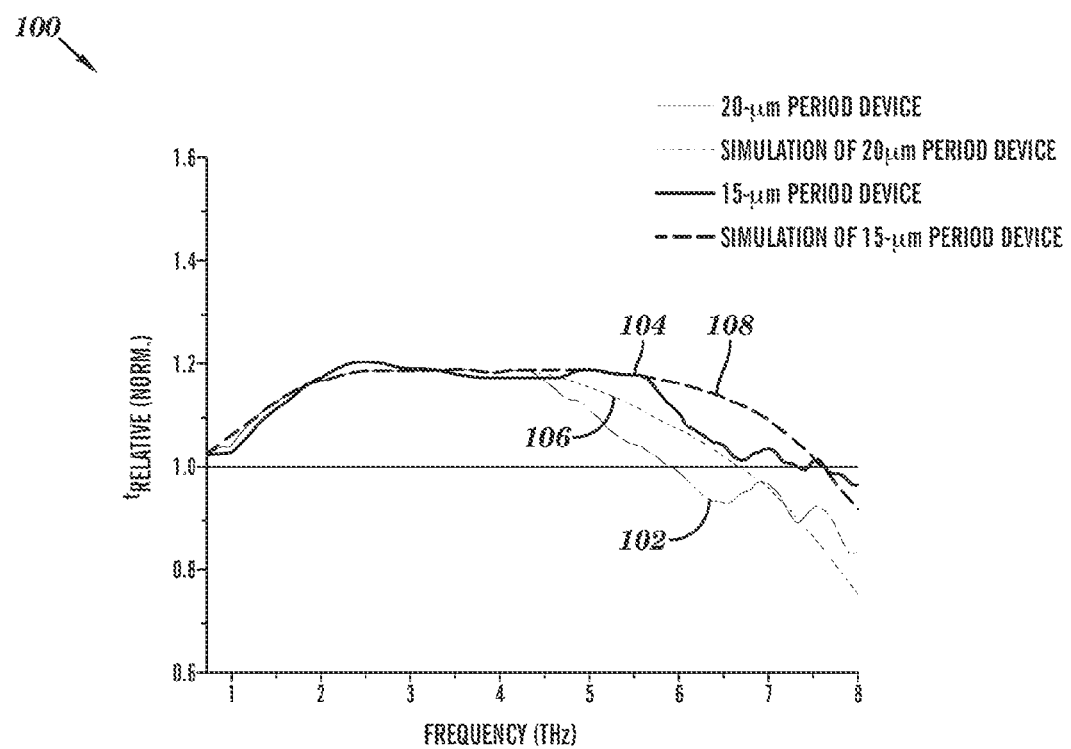
FIG. 13 is a graph of the relative transmission spectra of two devices according to aspects of the invention.

For a better comparison of frequency dependent anti-reflection performance, relative transmission spectra of the two devices according to aspects of the invention are plotted as solid curves in the graph 100 of FIG. 13. Curve 102 in for the 20-μm-period device FIG. 13 and curve 104 for the 15-μm-period device were derived from the Fourier-transform spectra of the waveforms and normalized to that of the silicon reference in FIG. 13. FIG. 13 also illustrates curves simulating results of the 20-μm-period device, curve 106, and for the 15-μm-period device, curve 108, as dotted curves. Theoretically, relative field transmission can be calculated as the square root of the ratio of anti-reflection device transmission coefficient over that of silicon, as discussed by Saleh, et al. (2007), the disclosure of which is included by reference.

For a perfect anti-reflection device (that is, a device having 0% reflectance) of silicon at THz frequency, the relative field transmission is 1.1947, which is the upper limit. The experimental results shown in FIG. 13 fit nicely with the simulation result before diffraction occurs. However, when the THz wavelength approaches the order of the devices' structure period, for example, when Equation (2) is satisfied, diffraction takes place, and transmission declines.

$$\lambda = \Lambda \cdot n_{silicon}, \quad (2)$$

In Equation (2), $\lambda$ is the THz wavelength and $\Lambda$ is the structure period, as disclosed by Bruckner, et al. (2009), the disclosure of which is include by reference herein. The onset of diffraction as indicated by Equation (2) causes a decline in transmission. This decline in transmission is seen in FIG. 13. For the 20-μm-period device, as shown in FIG. 13 (that is, curve 102), diffraction and decline in transmission starts at around 4.3 THz; and for the 15-μm-period device, as shown in FIG. 13 (that is, curve 104), diffraction and decline in transmission starts at about 5.8 THz. As frequency increases above these diffraction thresholds, diffraction dominates over transmission, and transmission declines further, as shown in FIG. 13. Consequently, as shown in FIG. 13, the anti-reflection effect for these aspects of the invention ceases at about 5.9 THz for the 20-μm-period device and at about 7.3 THz for the 15-μm-period device. This observed diffraction effect is in good agreement with theoretical calculations using Equation (2), where the diffraction threshold is calculated to be 5.7 THz for the 20-μm-period device and 7.1 THz for the 15 μm-period device. Furthermore, as shown in FIG. 13, the 3 decibel (dB) bandwidth of the device spans from about 1.4 THz to about 6.0 THz. This span defines a center frequency—$(f_L+f_H)/2=$ (1.4 THz+6.0 THz)/2— of 3.7 THz. Thus, the relative "3 dB bandwidth," which can be defined as of $\delta f/f_c$ (that is, (Full-width-half-maximum frequency/center frequency)=(6 THz− 1.4 THz)/3.7 THz=1.243), may be as large as 124.3%.

Figure 14:
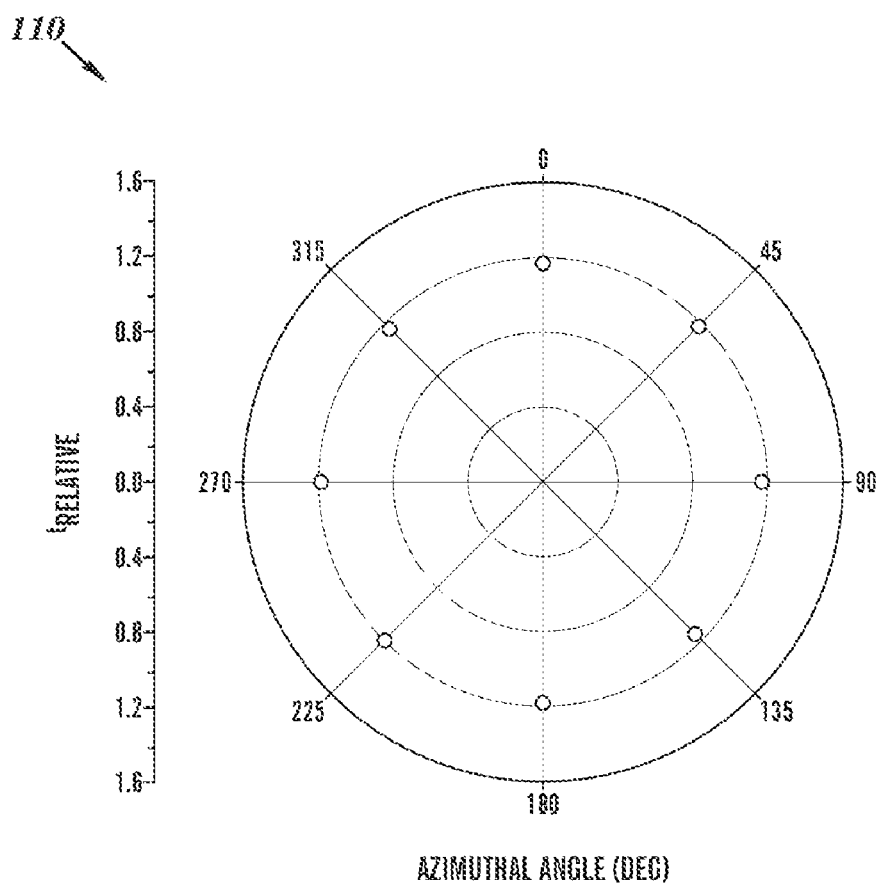
FIG. 14 is a plot of the relative transmission at center frequency of an aspect of the invention with respect to the azimuthal angle.
Figure 15:
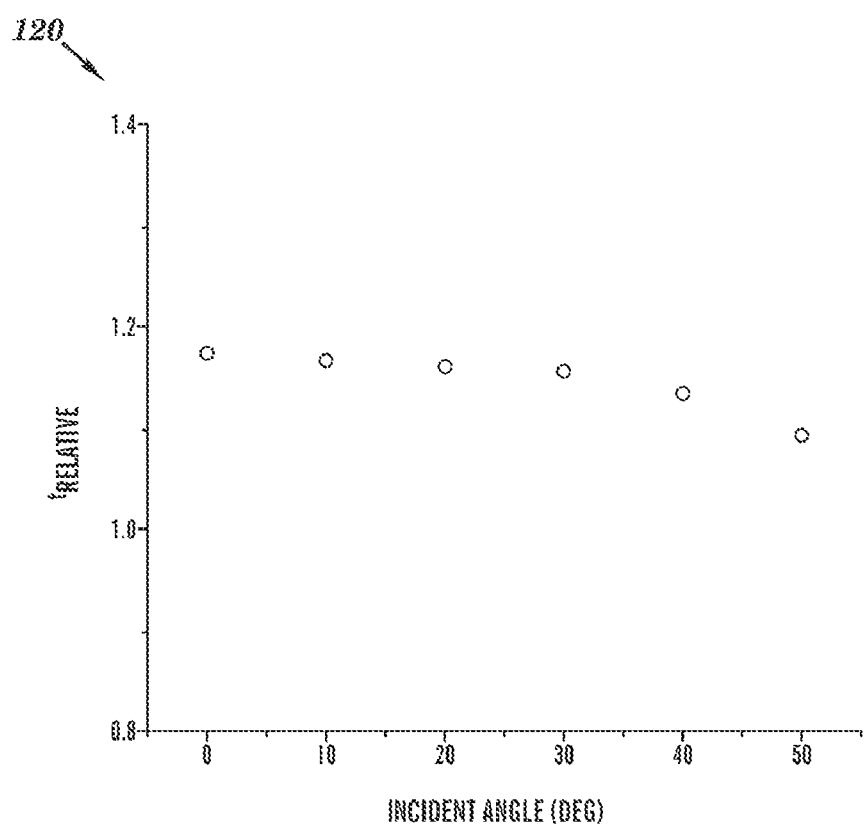
FIG. 15 is a plot of the relative transmission at center frequency of an aspect of the invention with respect to incident angle.

FIG. 14 is a plot 110 of the relative transmission at center frequency (that is, 3.7 THz) of a 15-μm-period device according to an aspect of the present invention plotted against the azimuth angle as it increases from 0° to 180° in 22.5° steps. FIG. 14 indicates that the performance of aspects of the present invention is independent of polarization. FIG. 15 is a plot 120 of the relative transmission at center frequency (that is, 3.7 THz) of a 15-μm-period device according to an aspect of the invention plotted against incident angle from 0° to 50° in 10° steps. FIG. 15 indicates that the performance of aspects of the present invention is, to a large extent, independent of the incident angle of the THz radiation.

Aspects of the present invention provide anti-reflection surfaces and devices, for example, three-dimensional, inverted, photonic grating devices, that reduce reflectance, for example, between the range of about 0.2 THz to about 7.35 THz, and have a 3 dB anti-reflection bandwidth of 4.7 THz, for example, with a structure period of 15 μm. The devices provided may be broadband devices that are tunable. Aspects of the invention may be employed in any device handling THz radiation, for example, in a THz lens, a THz beam splitter, or a THz filter, among other applications. The total thickness of the devices, for example, about 20 μm, may be much smaller than the THz wavelength. Thus, aspects of the invention are compact and compatible with a wide range of THz systems. In addition, the methods of fabricating aspects of the invention comprise standard semiconductor processing procedures and can be applied to other materials at any wavelength. As will be appreciated by those skilled in the art, features, characteristics, and/or advantages of the various aspects described herein, may be applied and/or extended to any embodiment (for example, applied and/or extended to any portion thereof).

Although several aspects of the present invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A terahertz (THz) radiation anti-reflection device comprising:
a substrate having a plurality of recesses, each of the plurality of recesses comprising a plurality of cavities of decreasing dimension.

2. The anti-reflection device as recited in claim 1, wherein the plurality of cavities comprise a plurality of nested polygonal cavities.

3. The anti-reflection device as recited in claim 2, wherein the plurality nested polygonal cavities comprise a plurality of nested cavities having a quadrilateral cross section.

4. The anti-reflection device as recited in claim 3, wherein the plurality of nested cavities having a quadrilateral cross section comprise cavities having one of a square and a rectangular cross section.

5. The anti-reflection device as recited in claim 1, wherein the plurality of recesses comprise a period.

6. The anti-reflection device as recited in claim 5, wherein the period ranges from 5 µm to 50 µm.

7. The anti-reflection device as recited in claim 6, wherein the period ranges from 10 µm to 20 µm.

8. The anti-reflection device as recited in claim 1, wherein the substrate comprises a substrate having a thickness between 5 µm and 50 µm.

9. The anti-reflection device as recited in claim 1, wherein the substrate comprises a silicon substrate.

10. The anti-reflection device as recited in claim 1, wherein each of the plurality of cavities share a common vertex.

11. The anti-reflection device as recited in claim 10, wherein the common vertex comprises a common corner.

12. The anti-reflection device as recited in claim 1, wherein at least two of the plurality of cavities comprise at least one wall sharing a common plane.

13. The anti-reflection device as recited in claim 12, wherein at least two of the plurality of cavities comprise a plurality of walls sharing a common plane.

14. The anti-reflection device as recited in claim 12, wherein each of the plurality of cavities comprises at least one wall sharing a common plane.

15. The anti-reflection device as recited in claim 14, wherein each of the plurality of cavities comprises a plurality of walls sharing common planes.

16. A method of fabricating a terahertz (THz) radiation anti-reflection device, the method comprising:
introducing a plurality of recesses to a substrate, each of the plurality of recesses comprising a plurality of cavities of decreasing dimension.

17. The method as recited in claim 16, wherein the plurality of cavities comprise a plurality of nested polygonal cavities.

18. The method as recited in claim 17, wherein the plurality nested polygonal cavities comprise a plurality of nested cavities having a quadrilateral cross section.

19. The method as recited in claim 18, wherein the plurality of nested cavities having a quadrilateral cross section comprise cavities having one of a square and a rectangular cross section.

20. The method as recited in claim 16, wherein the plurality of recesses comprise a period.

21. The method as recited in claim 20, wherein the period ranges from 5 µm to 50 µm.

22. The method as recited in claim 21, wherein the period ranges from 10 µm to 20 µm.

23. The method as recited in claim 16, wherein the substrate comprises a substrate having a thickness between 5 µm and 50 µm.

24. The method as recited in claim 16, wherein the substrate comprises a silicon substrate.

25. The method as recited in claim 16, wherein each of the plurality of cavities share a common vertex.

26. The method as recited in claim 25, wherein the common vertex comprises a common corner.

27. The method as recited in claim 16, wherein at least two of the plurality of cavities comprise at least one wall sharing a common plane.

28. The method as recited in claim 16, wherein at least two of the plurality of cavities comprise a plurality of walls sharing a common plane.

29. The method as recited in claim 16, wherein each of the plurality of cavities comprises at least one wall sharing a common plane.

30. The method as recited in claim 16, wherein each of the plurality of cavities comprises a plurality of walls sharing common planes.

31. A method for handling terahertz radiation comprising:
directing terahertz radiation on a substrate having a plurality of recesses, each of the plurality of recesses comprising a plurality of cavities of decreasing dimension; and
transmitting at least some of the terahertz radiation through the substrate while minimizing reflection of the terahertz radiation from the substrate with the plurality of recesses.

32. The method as recited in claim 31, wherein the plurality of cavities comprise a plurality of nested polygonal cavities.

33. The method as recited in claim 32, wherein the plurality of nested cavities having a quadrilateral cross section.

34. The method as recited in claim 33, wherein the plurality of nested cavities having a quadrilateral cross section comprise cavities having one of a square and a rectangular cross section.

35. The method as recited in claim 31, wherein the plurality of recesses comprise a period.

36. The method as recited in claim 35, wherein the period ranges from 5 µm to 50 µm.

37. The method as recited in claim 36, wherein the period ranges from 10 µm to 20 µm.

38. The method as recited in claim 31, wherein the substrate comprises a substrate having a thickness between 5 µm and 50 µm.

39. The method as recited in claim 31, wherein the substrate comprises a silicon substrate.

40. The method as recited in claim 31, wherein each of the plurality of cavities share a common vertex.

41. The method as recited in claim 40, wherein the common vertex comprises a common corner.

42. The method as recited in claim 31, wherein at least two of the plurality of cavities comprise at least one wall sharing a common plane.

43. The method as recited in claim 31, wherein at least two of the plurality of cavities comprise a plurality of walls sharing a common plane.

44. The method as recited in claim 31, wherein each of the plurality of cavities comprises at least one wall sharing a common plane.

45. The method as recited in claim 31, wherein each of the plurality of cavities comprises a plurality of walls sharing common planes.

* * * * *